US009250450B2

(12) United States Patent
Chang

(10) Patent No.: US 9,250,450 B2
(45) Date of Patent: Feb. 2, 2016

(54) ARTICLE SUPPORT DEVICE FOR APPLYING TO SKIN

(71) Applicant: Joseph Chang, Wyoming, MI (US)

(72) Inventor: Joseph Chang, Wyoming, MI (US)

(*) Notice: Subject to any disclaimer, the term of this patent is extended or adjusted under 35 U.S.C. 154(b) by 157 days.

(21) Appl. No.: 13/906,604

(22) Filed: May 31, 2013

(65) Prior Publication Data

US 2014/0354941 A1 Dec. 4, 2014

(51) Int. Cl.
*G02C 5/12* (2006.01)
*G02C 1/00* (2006.01)
*G02C 3/00* (2006.01)

(52) U.S. Cl.
CPC ............ *G02C 3/003* (2013.01); *G02C 5/124* (2013.01); *G02C 5/126* (2013.01)

(58) Field of Classification Search
CPC .......... G02C 5/12; G02C 5/126; G02C 3/003; G02C 5/122; G02C 5/124
USPC .............. 351/124, 132, 158, 178, 78, 80, 137
See application file for complete search history.

(56) References Cited

U.S. PATENT DOCUMENTS

| | | | |
|---|---|---|---|
| 3,046,989 A | 7/1962 | Hill | |
| 3,597,053 A * | 8/1971 | Mastman | 351/41 |
| 3,701,592 A * | 10/1972 | Fernandez | 351/130 |
| 3,758,202 A | 9/1973 | Chunga, Sr. | |
| 3,977,407 A | 8/1976 | Coleman et al. | |
| 4,120,304 A | 10/1978 | Moor | |
| 4,131,341 A * | 12/1978 | Bradley, Jr. | 351/132 |
| 4,190,334 A * | 2/1980 | O'Neil | 351/137 |
| 4,204,750 A * | 5/1980 | Hilbert | 351/130 |
| 4,251,302 A * | 2/1981 | Leonard et al. | 156/60 |
| 4,454,090 A * | 6/1984 | Saumell | 264/154 |
| 4,470,674 A * | 9/1984 | Piampiano | 351/136 |
| 4,490,141 A | 12/1984 | Lacko et al. | |
| 4,730,915 A * | 3/1988 | Jannard | 351/47 |
| 4,742,824 A | 5/1988 | Payton et al. | |
| 4,747,681 A | 5/1988 | Brower | |
| 4,781,451 A | 11/1988 | McAllen | |
| 4,787,729 A * | 11/1988 | Ruffen | 351/137 |
| 4,804,374 A | 2/1989 | Laskody | |
| 4,813,776 A * | 3/1989 | Borsos | 351/137 |
| 4,823,789 A * | 4/1989 | Beisang, III | 128/207.18 |
| 5,172,688 A | 12/1992 | Dillon | |
| 5,196,871 A * | 3/1993 | Tom | 351/132 |
| 5,416,923 A * | 5/1995 | Peugh | 2/9 |
| 5,513,635 A | 5/1996 | Bedi | |
| 5,526,070 A * | 6/1996 | Simioni | 351/138 |
| 5,581,312 A * | 12/1996 | Chen | 351/138 |
| 5,646,707 A * | 7/1997 | Arnette | 351/138 |
| 5,755,225 A | 5/1998 | Hutson | |

(Continued)

*Primary Examiner* — Zachary Wilkes
*Assistant Examiner* — Collin X Beatty
(74) *Attorney, Agent, or Firm* — Gardner, Linn, Burkhart & Foley LLP

(57) ABSTRACT

An article for temporarily affixing to the skin of a wearer about the wearer's nose to support eyeglasses worn by the wearer includes a flexible body having a back surface and a front surface, with the back surface including an adhesive for temporarily retaining the article on the skin of a wearer. The body includes a pair of edges that define the width of the body with the body being sized to be disposed on a wearer's nose. A protrusion is disposed on the front surface of the body, with the protrusion extending above a plane defined by the front surface. The protrusion is configured for engaging eyeglasses worn by a wearer when the article is affixed to the wearer's nose to thereby inhibit the eyeglasses from slipping down the wearer's nose.

15 Claims, 8 Drawing Sheets

(56) References Cited

U.S. PATENT DOCUMENTS

| | | | |
|---|---|---|---|
| 5,771,087 A * | 6/1998 | Martin et al. | 351/136 |
| 6,058,931 A | 5/2000 | Muchin | |
| 6,098,616 A | 8/2000 | Lundy, Jr. et al. | |
| 6,283,594 B1 | 9/2001 | Hamano | |
| 6,318,362 B1 | 11/2001 | Johnson | |
| 6,328,038 B1 | 12/2001 | Kessler et al. | |
| 6,340,228 B1 * | 1/2002 | Cummings et al. | 351/136 |
| 6,419,687 B1 * | 7/2002 | Berke | 606/204.45 |
| 6,582,074 B1 * | 6/2003 | Chen | 351/136 |
| 7,631,967 B1 * | 12/2009 | Huang | 351/138 |
| 2005/0148984 A1 * | 7/2005 | Lindsay et al. | 604/387 |
| 2008/0259271 A1 * | 10/2008 | De La Renaudiere | 351/139 |
| 2009/0020222 A1 * | 1/2009 | Hamano | 156/247 |
| 2012/0036608 A1 * | 2/2012 | Beliveau | 2/9 |
| 2012/0050666 A1 * | 3/2012 | Havens-Olmstead | 351/132 |

* cited by examiner

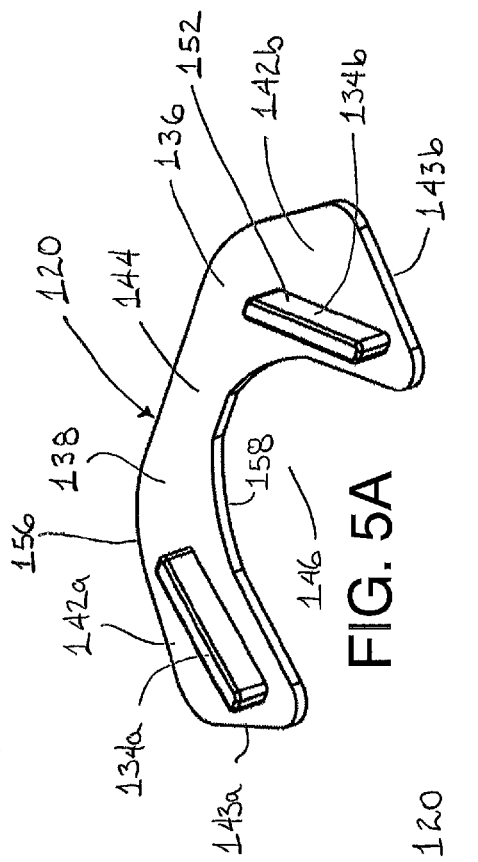
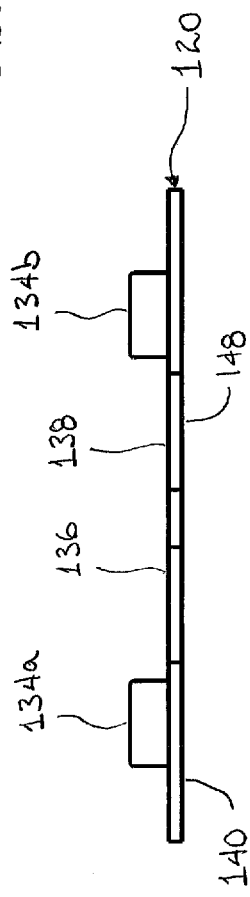
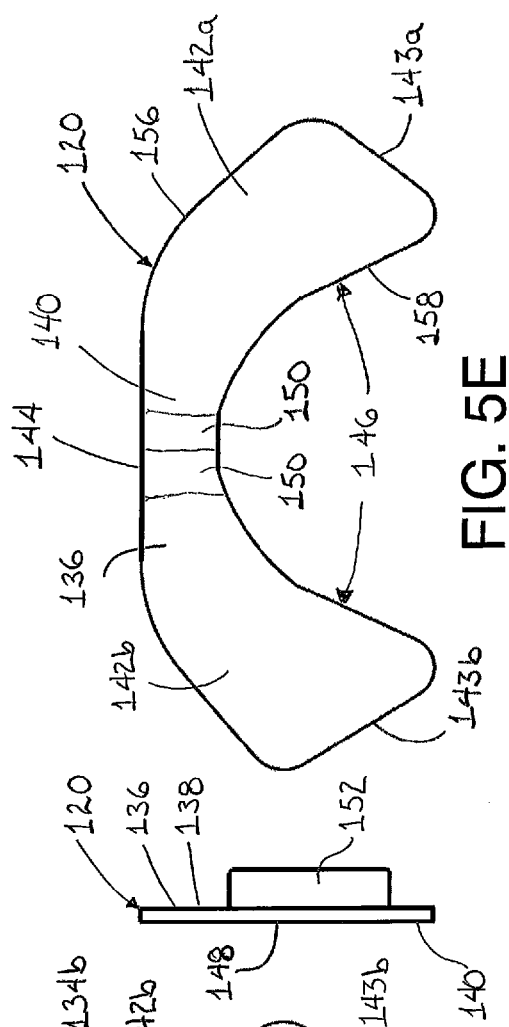
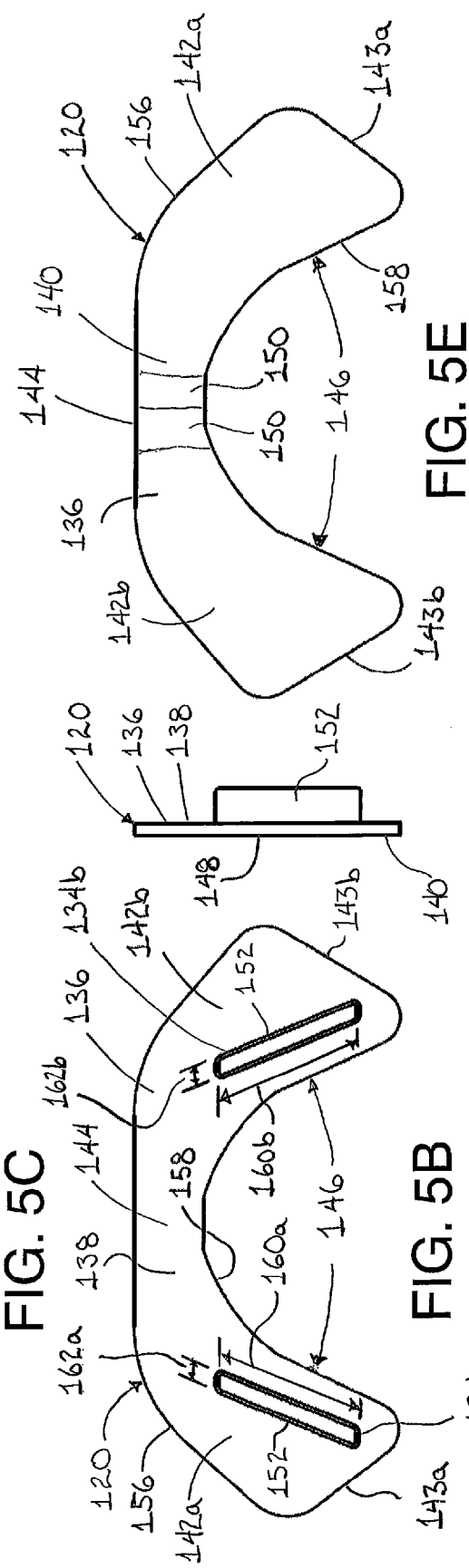
FIG. 5A
FIG. 5B
FIG. 5C
FIG. 5D
FIG. 5E

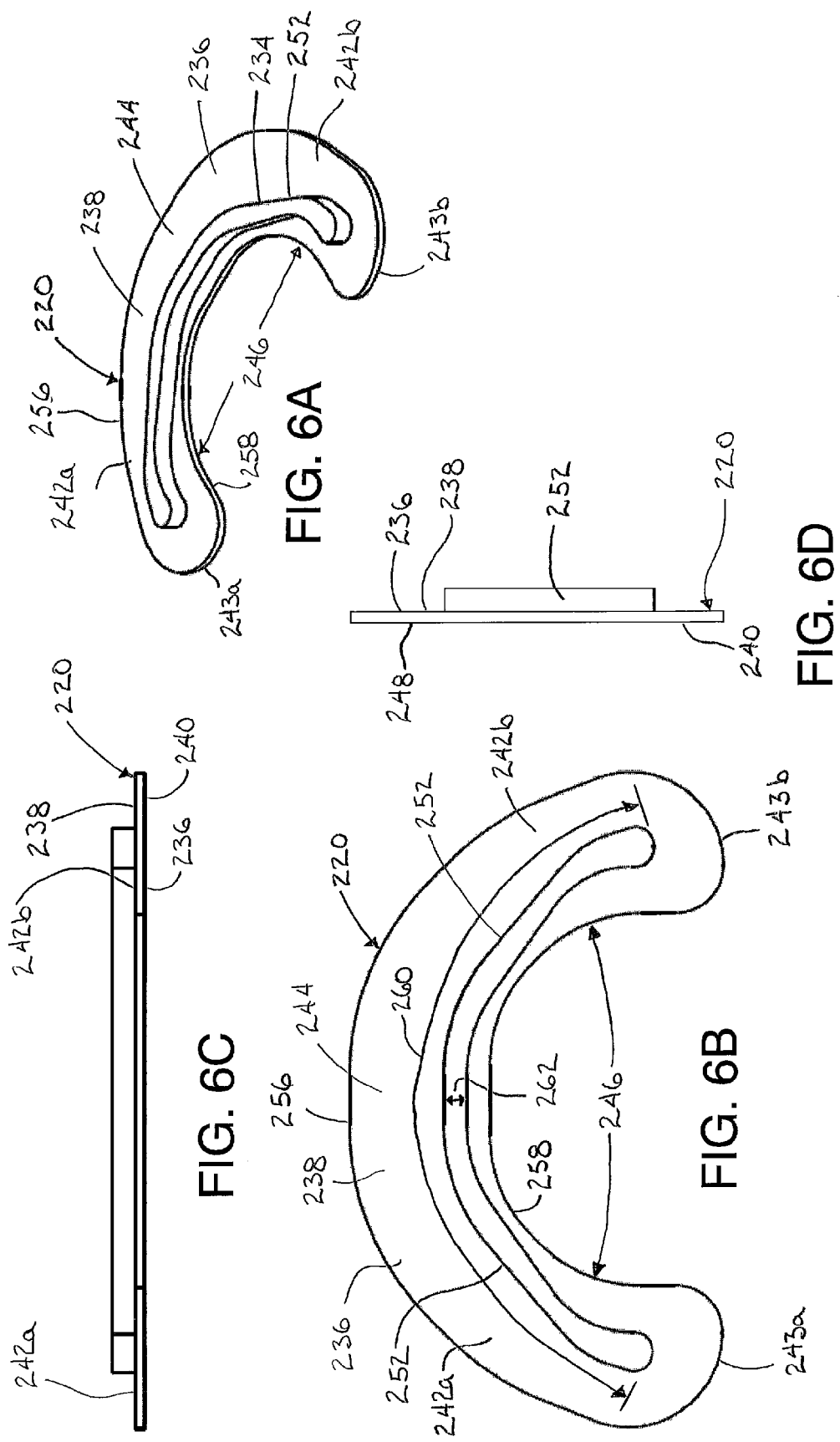

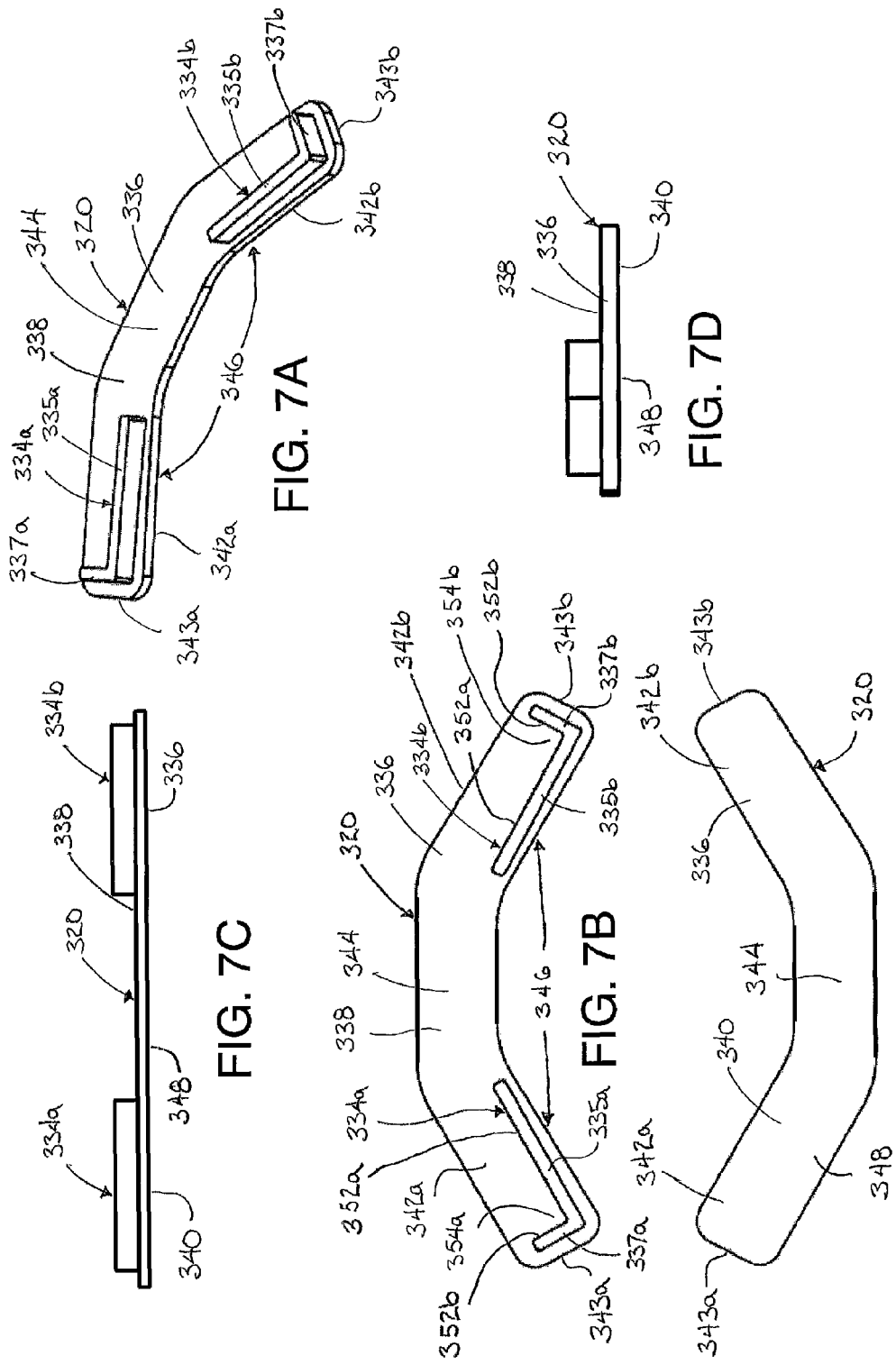

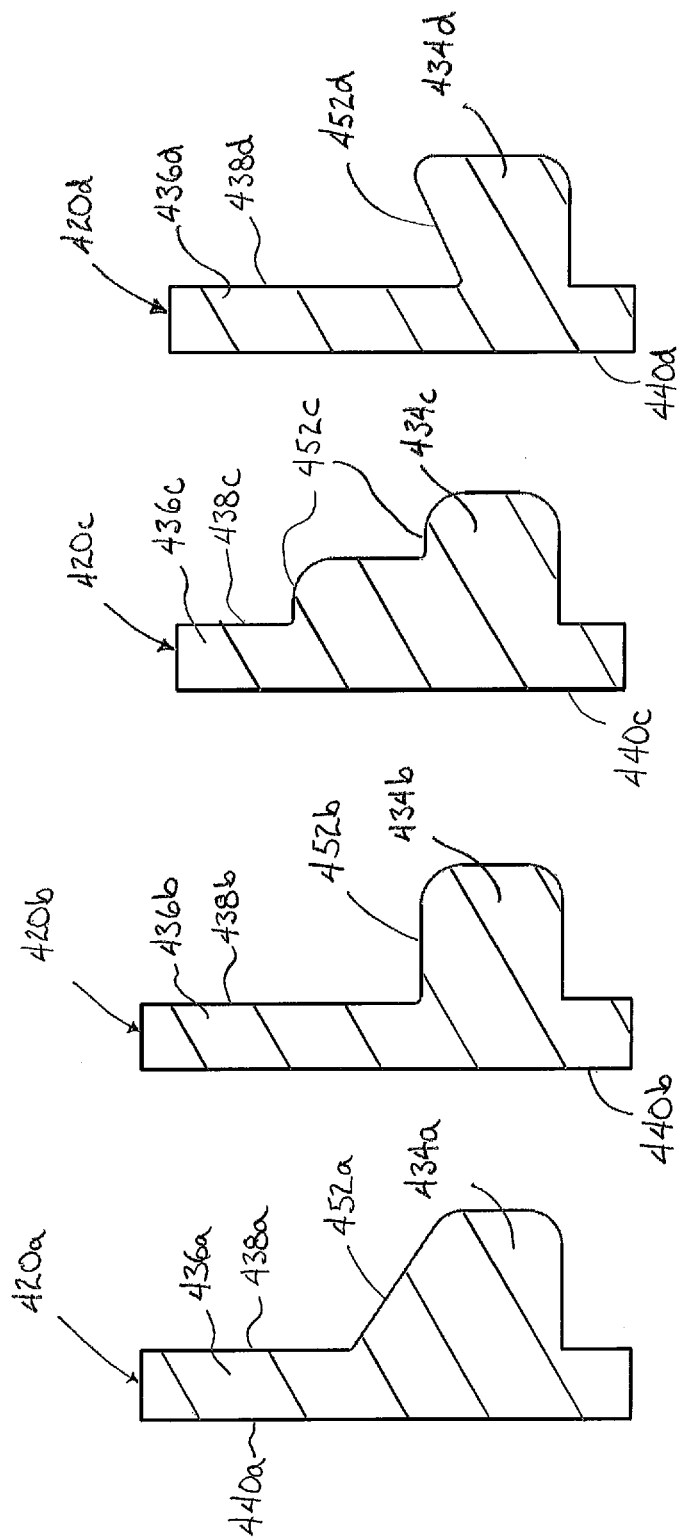

ARTICLE SUPPORT DEVICE FOR APPLYING TO SKIN

BACKGROUND OF THE INVENTION

The present invention is directed to an article support device for applying to the skin of a wearer, and in particular to an article, device, or element that aids in retaining eyeglasses in a desired position.

Many people who wear eyeglasses find it distracting and irritating when the glasses begin to slip down the length of the nose while being worn. This commonly occurs during mild physical activity, but can also occur during normal non-rigorous events, such as working, reading and other stationary activities. Eyeglass slippage typically occurs due to the weight of the glasses being distributed along three points of the face—the bridge of the nose and both ears —with the majority of weight being distributed at the bridge/nose. This slippage occurs more readily when the surface of the mechanism meant to keep the eyeglasses in place, such as nose pads or the bridge of the eyeglass frame, becomes coated with the individual's body oil, moisturizer, flaky skin or other foreign substances. The frictional resistance between the eyeglasses and wearer decreases and the weight of the eyeglasses, or forces applied thereto as a result of physical activity, supersedes the tactical surface resistance such that the glasses begin to slip at the point of least resistance, which is at the nose.

Articles requiring some form of permanent or temporary physical engagement to eyeglasses, such as through physical compression, encasement or attachment, are known for use in counteracting eyeglass slippage on a wearer. There is an inherent flaw in this methodology. The typical solutions involve a stickier surface or attachment at the nose pads or bridge of the plastic frame glasses, which then rest against the skin of the user, or some holding mechanism near the temple arms or tips, which compress against the head or back of the ear.

The added material at the nose pad or bridge that is typically involved in providing support for the eyeglasses, eventually fails, because the individual wearing the glasses, begins to perspire or secrete body oils. This can happen rather quickly. This then causes the original coefficient of friction that would exist between the material and the skin to lessen and eventually the weight of the glasses will supersede the lessened and/or weakened coefficient of friction/engagement.

The inherent flaw of the mechanisms which use the temple arms and point as a cantilever support, require the mechanism to create additional stress points behind and around the ear, causing pressure and discomfort. Eventually, this means of supporting the glasses fails as well, along with the discomfort it causes, because it does not address the primary problem, the weight of the glasses at the nose and bridge area of the glasses. The issue of perspiration and skin oil still exist and the weight of the glasses will eventually overcome the cantilever support of the mechanisms.

Another means which use the temple arms and tips are bands, which hold the entire eyeglasses and band in compression again the head/skull, which is both inconvenient and causes long term and short term discomfort.

SUMMARY OF THE INVENTION

The present invention provides an article for temporarily affixing to the skin of a wearer, such as about the wearer's nose to support eyeglasses worn by the wearer.

According to an aspect of the present invention, an article for temporarily affixing to the skin of a wearer to support eyeglasses worn by the wearer comprises a flexible body sized to be disposed on a wearer's nose. The body includes a back surface, a front surface and an edge or a pair of edges, with the edges defining the width of the body and the back surface including an adhesive for temporarily retaining the article on the skin of a wearer. A protrusion is disposed on the front surface and extends above a plane defined by the front surface, with the protrusion being configured to engage eyeglasses worn by a wearer when the article is affixed to the wearer's nose to thereby inhibit the eyeglasses from slipping down the wearer's nose.

In particular embodiments the article includes a pair of protrusions. The protrusions may be elongate and/or curved. Still further, the body may include a pair of distally oriented side portions separated by a central portion with the side portions being oriented with respect to the central portion to form a gap whereby in use with the central portion disposed about the bridge of a wearer's nose the side portions extend generally downwardly along the side of the wearer's nose. In such an embodiment the body may be curved, or the side portions may be oriented non-linearly relative to the central portion. The protrusion may include a support surface configured for engaging with eyeglasses to inhibit the eyeglasses from slipping down the wearer's nose. Still further, one or more removable tabs may be disposed on the back surface of the article to cover the adhesive prior to application to the skin of a wearer.

According to another aspect of the present invention, a method of inhibiting eyeglasses worn by a wearer from slipping down the wearer's nose comprises providing the noted article and temporarily affixing it to the skin of a wearer about the wearer's nose, whereby the protrusion is configured for engaging eyeglasses worn by the wearer to thereby inhibit the eyeglasses from slipping. The article may alternatively be employed for aiding in retaining other objects on or to a wearer.

The article and method of the present invention provides an effective and cost efficient device for inhibiting slippage of eyeglasses down a wearer's nose. The article may be temporarily affixed about a wearer's nose as desired to prevent eyeglass slippage, such as when undergoing physical movement or activity. It should be noted that the article is not dependent upon any attachment to the glasses themselves. Instead, it attaches to the skin of the user, and is designed to support the glasses at its heaviest point (typically the area around the nose or cheeks). Because the article adheres to the user and not to the glasses themselves, it solves the previous problem of sticky material, which is used on the glasses, to provide support against the skin of the user at the nose or bridge. As previously mentioned, when this type of solution is used and glasses move or shift, the sticky material that is used, has a tendency to disengage from the skin. Once disengaged, the material loses its stickiness, because foreign substances (oils, skin, etc), adhere to the material, which then dramatically reduces its effectiveness after each such action. Similar to tape that is repeatedly removed from the surface it was meant to attach too. Because the article does not behave in this manner, once applied, it retains its attachment to the skin and therefore, keeps the glasses in position, regardless of how many times the glasses shift or how often the user perspires sweat or oil.

These and other objects, advantages, purposes and features of this invention will become apparent upon review of the following specification in conjunction with the drawings.

BRIEF DESCRIPTION OF THE DRAWINGS

FIG. 5A is a perspective view of an article support device in accordance with the present invention shown in a flat orientation prior to being applied to a wearer;

FIG. 5B is a top view of the device of FIG. 5A;

FIG. 5C is a front edge view of the device of FIG. 5A;

FIG. 5D is a side edge view of the device of FIG. 5A;

FIG. 5E is a bottom view of the device of FIG. 5A;

FIG. 6A is a perspective view of an alternative article support device in accordance with the present invention shown in a flat orientation prior to being applied to a wearer;

FIG. 6B is a top view of the device of FIG. 6A;

FIG. 6C is a front edge view of the device of FIG. 6A;

FIG. 6D is a side edge view of the device of FIG. 6A;

FIG. 7A is a perspective view of yet another article support device in accordance with the present invention shown in a flat orientation prior to being applied to a wearer;

FIG. 7B is a top view of the device of FIG. 7A;

FIG. 7C is a front edge view of the device of FIG. 7A;

FIG. 7D is a side edge view of the device of FIG. 7A;

FIG. 7E is a bottom view of the device of FIG. 7A;

FIGS. 8A-8D are cross-sectional views of still further article support devices in accordance with the present invention illustrating alternative profile configurations;

DESCRIPTION OF THE PREFERRED EMBODIMENTS

Figure 1:
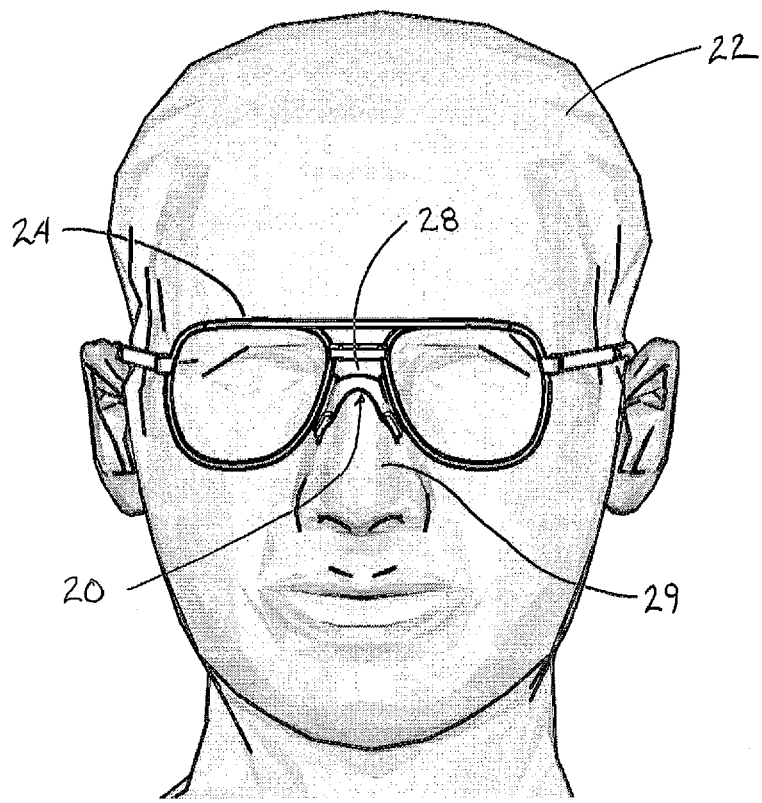
FIG. 1 is a front view of an individual wearing an article support device in accordance with the present invention to support eyeglasses having nose pads.
Figure 2:
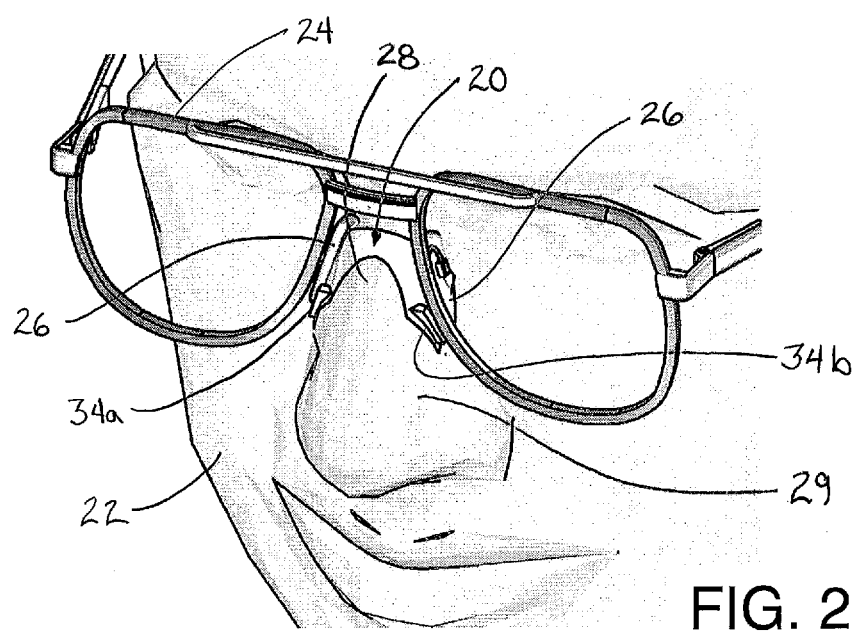
FIG. 2 is a partial perspective view of the individual of FIG. 1.

The present invention will now be described with reference to the accompanying figures, wherein the numbered elements in the following written description correspond to like-numbered elements in the figures. FIGS. 1-4 illustrate an article, device or element 20 in accordance with the present invention that is applied to the skin of an individual or wearer 22 and used to support eyeglasses. In FIGS. 1 and 2, eyeglasses 24 include nose pads 26 for supporting eyeglasses 24 proximate the bridge 28 of the nose 29 of individual 22, and in FIG. 4 eyeglasses 30 do not include nose pads, but rather the frames of eyeglasses 30 include a U-shaped or V-shaped bridge portion 32 for supporting eyeglasses 30 on the nose 29 of individual 22. As shown, article 20 comprises a flexible strip that is applied directly to the skin of wearer 22 about nose bridge 28, such as via an adhesive or mastic on the back of article 20, with article 20 including protrusions formed as ridges or ledges or protuberances 34a, 34b with which nose pads 26 of eyeglasses 24 or the bridge portion 32 of eyeglasses 30 may engage or rest to aid in retaining the eyeglasses in position on wearer 22. Article 20 thus provides a physical barrier or support for aiding in the retention of eyeglasses on a wearer.

With reference now to FIGS. 5A-5E, an embodiment of an article support device is shown as article, device or element 120. Article 120 comprises a base portion or body 136 comprising a generally curved strip of flexible material that, in the illustrated embodiment, has a planar top or front surface 138 and a planar bottom or back surface 140. As shown, body 136 has a pair of legs or side portions 142a, 142b joined at a central portion 144, with side portions 142a, 142b being downwardly angled from central portion 144 relative to each other with respect to the orientation in which article 120 is worn by a user to define the generally curved orientation of body 136. That is, side portions 142a, 142b extend downwardly along the sides of the nose 29 of a wearer 22 relative to central portion 144 spanning the bridge 28 of the nose 29 of the wearer 22. Accordingly, a gap or arc 146 is formed between side portions 142a, 142b, which in the embodiment of FIGS. 5A-5E is generally U-shaped.

Still further, in the embodiment of FIGS. 5A-5E, the widths of side portions 142a, 142b are greater at ends 143a, 143b relative to the widths of side portions 142a, 142b adjacent with central portion 144. This provides greater attachment area to the sides of the wearer's nose 29 in the area where article 120 engages with eyeglasses, and a smaller portion spanning the bridge 28 of the nose 29. Article 120 defines a curved length extending between ends 143a, 143b. Still further, article 120 includes an upper edge 156 and a lower edge 158, relative to the orientation in which article 120 is worn by a user and between which the width of article 120 is defined.

Article 120 may be constructed of a woven, plastic or latex material, or the like, with back surface 140 including an adhesive 148 for securing article 120 to the skin of a wearer 22. Moreover, some or all of article 120 may be constructed to be either transparent or translucent to minimize the appearance or visibility of the device when worn on an individual. One or more tabs or covering strips 150 (FIG. 5E) are initially positioned over back surface 140 to prevent exposure of adhesive 148 until strips 150 are peeled off prior to adhering article 120 to the skin of a user, such as in the nature of an adhesive bandage.

Figure 2A:
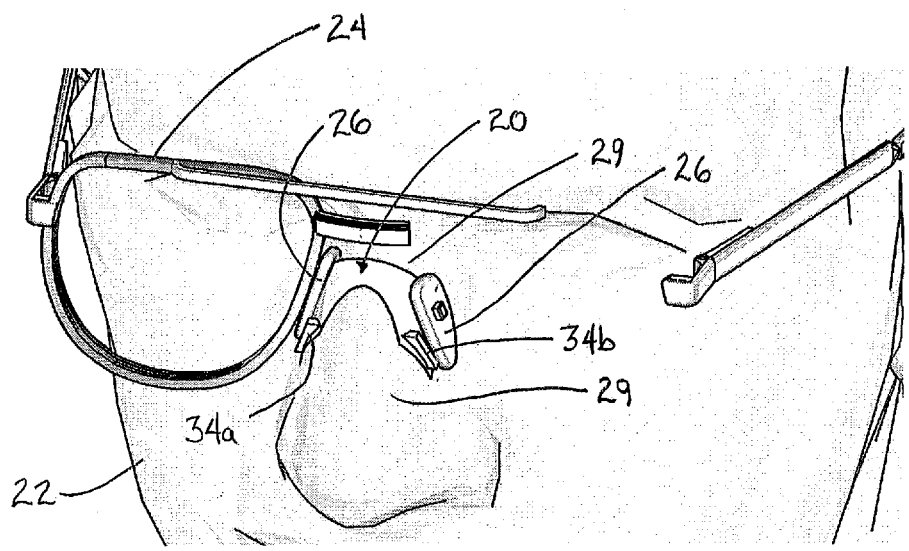
FIG. 2A is a partial perspective view of the individual of FIG. 1 with portions of the eyeglasses not shown for illustrative purposes.
Figure 3:
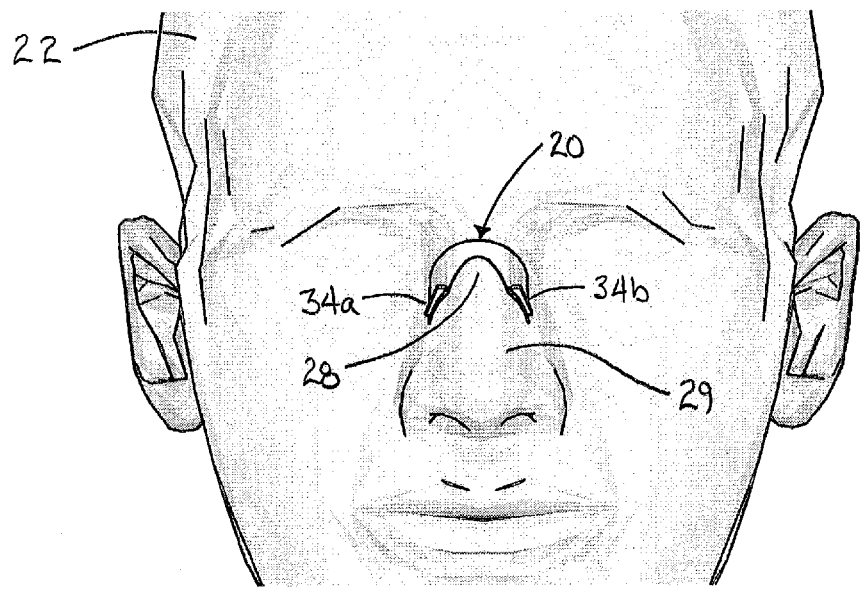
FIG. 3 is a partial front view of the individual of FIG. 1 shown with the eyeglasses removed and the article support device disposed across the bridge of the wearer's nose.
Figure 4:
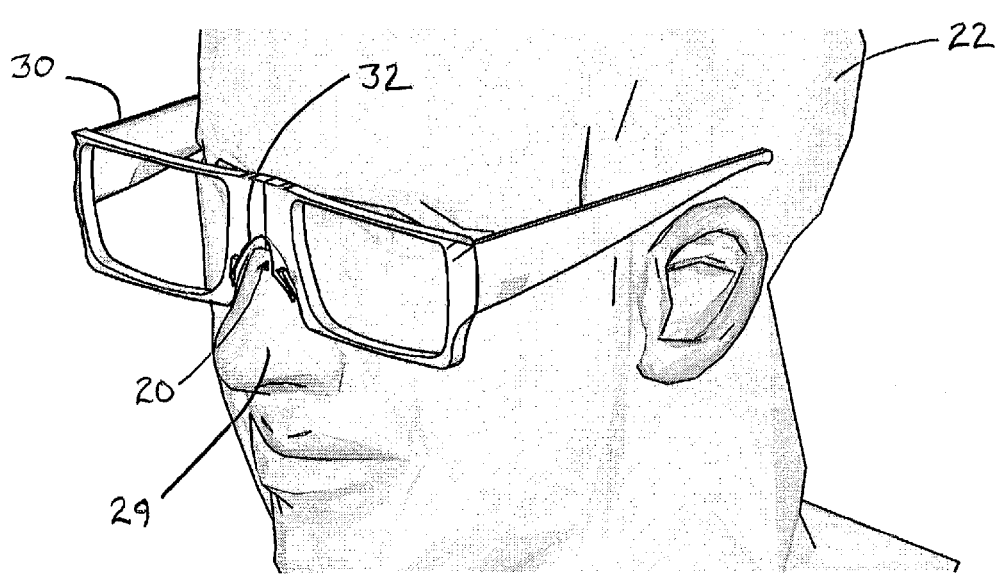
FIG. 4 is a perspective view of the individual of FIG. 1 wearing an article support device in accordance with the present invention to support an alternative style of eyeglasses without nose pads.

Front surface 138 is textured by way of a pair of protuberances 134a, 134b extending outwardly from or relative to front surface 138 to form ledges or ridges on front surface 138. Protuberances 134a, 134b each include a support surface 152 against which eyeglasses worn by an individual are restrained, such as via contact with the nose pads 26 of eyeglasses 24 or the bridge portion 32 of eyeglasses 30. Moreover, in use a portion of eyeglasses 24 or 30 contacts the front surface 138 of article 120, as understood from FIGS. 2A and 4.

In the embodiment of FIGS. 5A-5D, protuberances 134a, 134b are disclosed as being separate, linear ridges extending generally along or with the length of each of side portions 142a, 142b, with protuberances 134a, 134b angling upwards relative to each other with respect to the orientation in which article 120 is worn by a user. Moreover, protuberances 134a, 134b and their respective support surfaces 152 are shown to be generally orthogonal with respect to front surface 138. Protuberances 134a, 134b each have axial lengths 160a, 160b that is substantially greater than their widths 162a, 162b, respectively. In the illustrated embodiment the lengths 160a, 160b are approximately 10 to 25 millimeters (mm), depending in part on the size needed for a particular user, and the widths 162a, 162b are approximately 2 mm.

It should be understood that alternatively configured article supports may be employed within the scope of the present invention. For example, a support article may have a non-planar to surface and/or have a single protuberance or more than two protuberances, and/or the protuberance(s) may be non-linear. Still further, some or all of the front surface, including the protuberance(s), may either be non-sticky or sticky, with a sticky surface being provided to further aid in the retention of eyeglasses. A mastic material, for example, may be applied to the front surface to provide stickiness. It should be further appreciated that the protuberances or projections of the support article may be constructed to have alternative cross sectional shapes and to project outwardly relative to the front surface to varying distances, including projecting outwardly within the range of approximately 1 mm to 6 mm, for example, such as relative to a plane defined by the top surface.

An alternative embodiment of an article support device is shown in FIGS. 6A-6D as article, device or element 220. Article 220 is of similar construction to the above discussed article 120, with the similar components or elements of article 220 being shown with similar reference numbers as used in FIGS. 5A-5E with respect to article 120, but with 100 added to the reference numbers of FIGS. 6A-6D. It should be understood that, because of the similarity of article 220 to article 120, not all of the specific construction and alternatives of liked reference parts will be discussed in the following discussion of article 220.

Article 220 includes a base portion or body 236 comprising a generally U-shaped curved strip of flexible material with a top or front surface 238 and a planar bottom or back surface 240. Body 236 has a pair of legs or side portions 242a, 242b joined at a central portion 244, with side portions 242a, 242b curving downwardly from central portion 244 relative to each other with respect to the orientation in which article 220 is worn by a user to define the generally curved orientation of body 236. As with article 120, side portions 242a, 242b extend downwardly along the sides of the nose 29 of a wearer 22 relative to central portion 244 spanning the bridge 28 of the nose 29 of the wearer 22. Accordingly, a gap or arc 246 is formed between side portions 242a, 242b, which in the embodiment of FIGS. 6A-6D is generally U-shaped. In the embodiment of FIGS. 6A-6D, body 236 has a generally constant width from end 243a to end 243b, including at central portion 244, and defines a curved length extending from end 243a to end 243b. Still further, article 220 includes an upper edge 256 and a lower edge 258, relative to the orientation in which article 220 is worn by a user and between which the width of article 220 is defined.

Article 220 may be constructed of a woven, plastic or latex material, or the like, and some or all of article 220 may be constructed to be either transparent or translucent. Back surface 240 includes an adhesive 248 for securing article 220 to the skin of a wearer 22, with one or more tabs or covering strips (not shown) initially being positioned over back surface 240 to prevent exposure of adhesive 248 until the strips are peeled off prior to adhering article 220 to the skin of a user.

Front surface 238 further includes a single protuberance 234 extending outwardly from or relative to front surface 238 to form a ledge or ridge thereon. Protuberance 234 includes or forms a support surface 252 against which eyeglasses worn by an individual are restrained, such as via contact with the nose pads 26 of eyeglasses 24 or the bridge portion 32 of eyeglasses 30. In the embodiment of FIGS. 6A-6D, protuberance 234 is disclosed as a single, generally curved ridge, with straighter portions in the location at which eyeglasses would contact support surface 252. Moreover, support surface 252 is shown to be generally orthogonal with respect to front surface 238. Protuberance 234 each has an axial curved length 260 that is substantially greater than its width 262. In the illustrated embodiment the lengths 260 is approximately 25-60 mm and the width 262 is approximately 2 mm.

Still another alternative embodiment of an article support device is shown in FIGS. 7A-7E as article, device or element 320. Article 320 is of similar construction to the above discussed articles 120 and 220, with the similar components or elements of article 320 being shown with similar reference numbers as used in FIGS. 5A-5E with respect to article 120 and FIGS. 6A-6D with respect to article 220, but with 200 and 100 added to the reference numbers, respectively, in FIGS. 7A-7E. It should be understood that, because of the similarity of article 320 to articles 120 and 220, not all of the specific construction and alternatives of liked reference parts will be discussed in the following discussion of article 320.

Article 320 includes a base portion or body 336 comprising a strip of flexible material with a top or front surface 338 and a planar bottom or back surface 340. Body 336 has a pair of legs or side portions 342a, 342b joined with a central portion 344, with side portions 342a, 342b extending angularly downward from central portion 344 relative to each other with respect to the orientation in which article 320 is worn by a user to define a generally curved orientation of body 336. As with articles 120 and 220, side portions 342a, 342b extend downwardly along the sides of the nose 29 of a wearer 22 relative to central portion 344 spanning the bridge 28 of the nose 29 of the wearer 22. Accordingly, a gap or arc 346 is formed between side portions 342a, 342b. In the embodiment of FIGS. 7A-7E, body 336 has a generally constant width from end 343a to end 343b, including at central portion 344, and defines a curved length extending from end 343a to end 343b. Still further, article 320 includes an upper edge 356 and a lower edge 358, relative to the orientation in which article 320 is worn by a user and between which the width of article 320 is defined.

Article 320 may be constructed of a woven, plastic or latex material, or the like, and some or all of article 320 may be constructed to be either transparent or translucent. Back surface 340 includes an adhesive 348 for securing article 320 to the skin of a wearer 22, with one or more tabs or covering strips (not shown) initially being positioned over back surface 340 to prevent exposure of adhesive 348 until the strips are peeled off prior to adhering article 320 to the skin of a user.

Front surface 338 further includes a pair of protuberances 334a, 334b extending outwardly from or relative to front surface 338 to form ledges or ridges thereon, and against which eyeglasses worn by an individual are restrained, such as via contact with the nose pads 26 of eyeglasses 24 or the bridge portion 32 of eyeglasses 30.

In the embodiment of FIGS. 7A-7E, protuberances 334a, 334b are disclosed as being separate, with each of the protuberances 334a, 334b having a first portion 335a, 335b and a second portion 337a, 337b, respectively. In the illustrated embodiment, the first portions 335a, 335b are generally linear and extend generally along or with the length of each of side portions 342a, 342b, with the first portions 335a, 335b angling upwards relative to each other with respect to the orientation in which article 320 is worn by a user. Second portions 337a, 337b are angled with respect to the first portions 335a, 335b, respectively, and generally extend along or with the width of side portions 342a, 342b. Each of the first portions 335a, 335b and second portions 337a, 337b include support surfaces 352a, 352b, respectively, with a corner, pocket, or receptacle 354a, 354b being formed by each of the protuberances 334a, 334b, respectively, (FIG. 7B) for providing further support to eyeglasses worn by an individual 22 when in use.

Protuberances 334a, 334b are disclosed as being generally L-shaped in the embodiment of FIGS. 7A-7E when viewed in the orientation of FIG. 7B. Moreover, the L-shaped lengths of protuberances 334a, 334b are substantially greater than their widths. It should be appreciated, however, that alternative configurations may be provided in which protuberances include first and second portions to form a pocket or receptacle, including, for example, a curved, hook shape.

Article support devices may be constructed in accordance with the present invention having variously configured textured ridges, ledges or protuberances. Referring now to FIGS. 8A-8D, cross sectional views of a series of alternatively configured article support devices 420a-420d, respectively, are illustrated with differently configured profiles. The articles 420a-420d are shown in a vertical orientation as they would be worn for supporting eyeglasses. The article support devices 420a-420d each comprise a body 436a-436d having a front surface 438a-438d, as well as a back surface 440a-440d to which adhesive is applied. The article support devices 420a-420d each further include a protuberance 434a-434d defining a ridge or ledge, with each protuberance including a support surface 452a-452d.

In the embodiment of article 420a in FIG. 8A, support surface 452a forms a downwardly angled surface relative to front surface 438a. That is, support surface 452a forms an obtuse angle with respect to front surface 438a. In contrast, in the embodiment of article 420d in FIG. 8D, support surface 452d forms an upwardly angled surface relative to front surface 438d. That is, support surface 452d forms an acute angle with respect to front surface 438d. Still further, in the embodiment of article 420c in FIG. 8C, the support surface 452c is undulating to include multiple locations for supporting or engaging with an object, such as eyeglasses. Still further, an alternative protuberance configuration may have a curved or rounded cross-sectional profile.

Figure 9A:
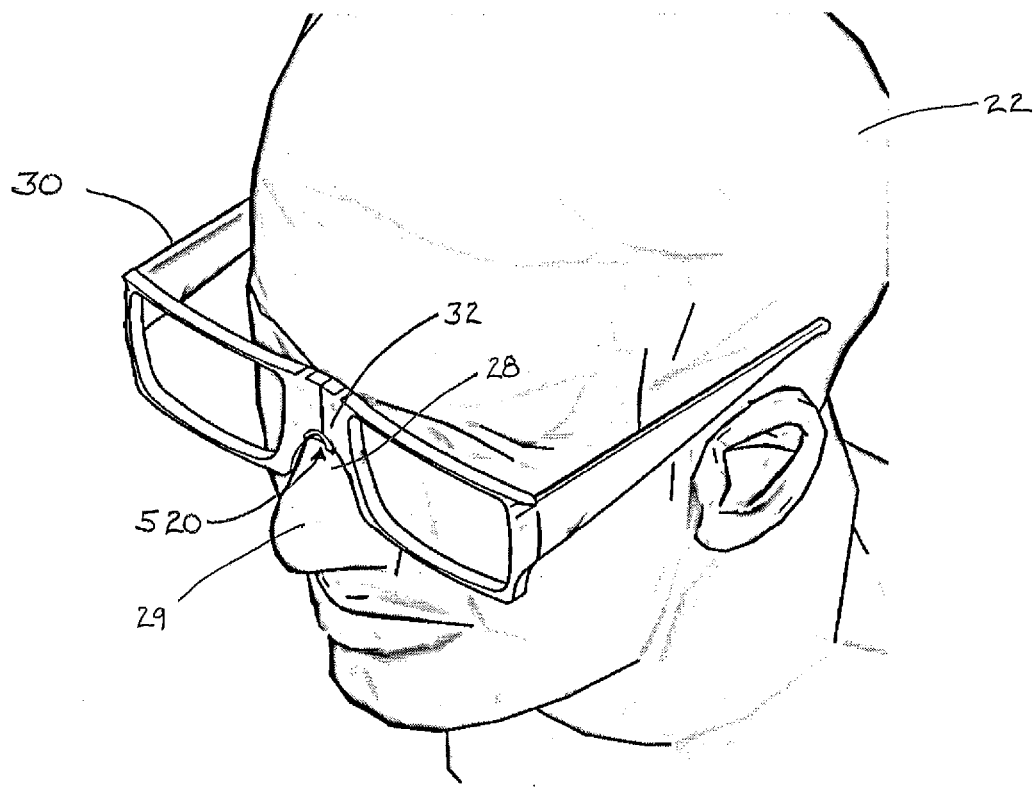
FIG. 9A is a perspective view of an individual wearing an alternative article support device in accordance with the present invention.
Figure 9B:
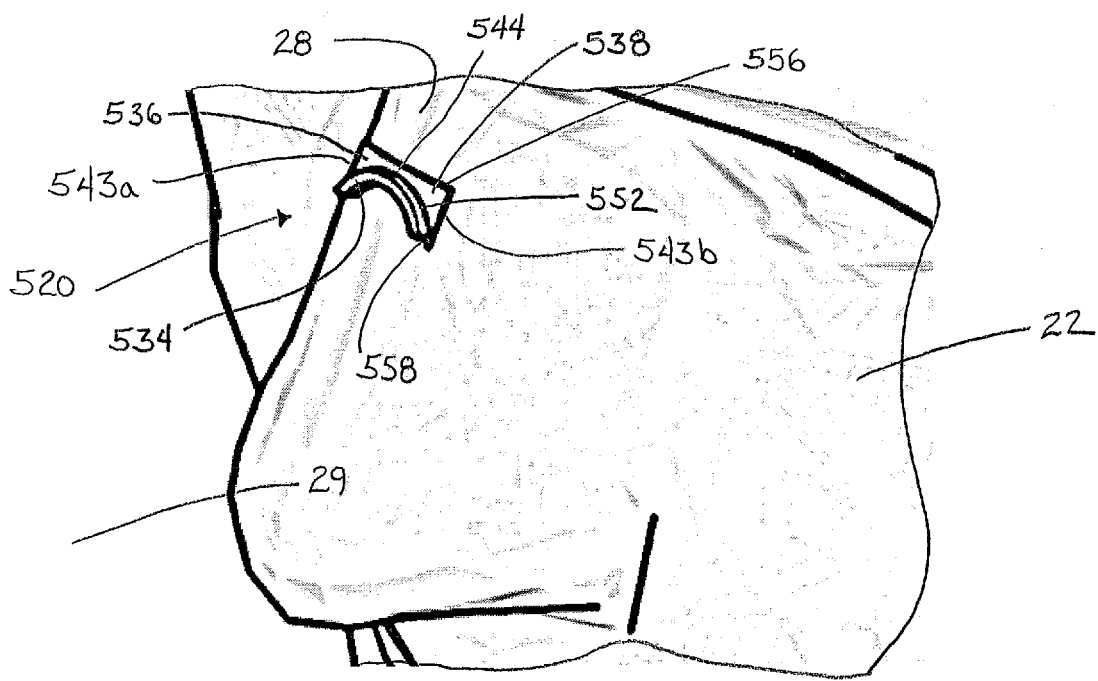
FIG. 9B is a partial perspective view of the individual of FIG. 9A shown with the eyeglasses removed.

Still a further alternative embodiment of an article support device is shown in FIGS. 9A-9B as article, device or element 520. Article 520 is of similar construction to the above discussed articles 120, 220 and 320 with the similar components or elements of article 520 being shown with similar reference numbers as used with respect to article 220, but with 300 added to the reference numbers of FIGS. 9A-9B. It should be understood that, because of the similarity of article 520 to articles 120, 220 and 320, not all of the specific construction and alternatives of liked reference parts will be discussed in the following discussion of article 520.

Article 520 includes a base portion or body 536 comprising a strip of flexible material with a top or front surface 538. Body 536 has a central portion 544 that is disposed over the bridge 28 of the nose 29 of wearer 22, but unlike the other embodiments does not include a pair of legs or side portions joined to central portion 544 for adhering to the sides of the nose. In the embodiment of FIGS. 9A-9B, body 536 includes a generally straight upper edge 556, a curved lower edge 558, and ends 543a,543b relative to the orientation in which article 520.

Article 520 may be constructed of a woven, plastic or latex material, or the like, and some or all of article 520 may be constructed to be either transparent or translucent. The back surface (not shown) includes an adhesive for securing article 520 to the skin of a wearer 22, with one or more tabs or covering strips (not shown) initially being positioned over the back surface to prevent exposure of the adhesive until the strips are peeled off prior to adhering article 520 to the skin of a user.

Front surface 538 further includes a single, arched protuberance 534 extending outwardly from or relative to front surface 538 to form a ledge or ridge thereon. Protuberance 534 includes or forms a support surface 552 against which eyeglasses worn by an individual are restrained, such as via contact with the bridge portion 32 of eyeglasses 30. In the embodiment of FIGS. 9A-9B, protuberance 534 is disclosed as a single, generally curved ridge.

The support articles of the present invention provide an efficient and easy means of aiding in the retention of objects worn by individuals, such as for preventing slippage of eyeglasses on a wearer's nose. The articles conveniently support the objects without requiring physical interconnection between the article and object being supported. Although described herein as being used to support eyeglasses worn by an individual, it should be appreciated that the devices may alternatively be used to support other objects worn by an individual. Still further, the physical design itself is also self adjusting in nature. When the article is secured to a wearer's nose, the orientation of the protrusion allows for the eyeglasses to self seat and provides maximum contact against the article, thereby limiting alignment problems and complexity associated to seating the glasses. As the nose pads or bridge is seated on the support article, the profile of the ledge when applied to the nose, creates a triangular shape in relation to the contact surface of the bridge or nose pad. The angled upper sides allow for the self seating and alignment, once the pads or bridge settles down onto the protrusion(s).

Changes and modifications in the specifically described embodiments can be carried out without departing from the principles of the present invention which is intended to be limited only by the scope of the appended claims, as interpreted according to the principles of patent law including the doctrine of equivalents.

I claim:

1. An article for temporarily affixing to the skin of a wearer about the wearer's nose to support eyeglasses worn by the wearer, said article comprising:
   a body said body being elongate and having a U-shape and comprising a flexible strip having a back surface, a front surface and a pair of edges, said edges defining the width of said body with said body being sized to be disposed on a wearer's nose, wherein said back surface includes an adhesive for temporarily retaining said article on the skin of a wearer and said front surface comprises a non-adhesive surface;
   wherein said body includes a pair of distally oriented side portions separated by a central portion with said side portions being oriented with respect to said central portion to form a gap between said side portions with said side portions being unitarily formed with and angularly disposed to said central portion to define the U-shape of said body whereby in use with said central portion disposed about the bridge of a wearer's nose said side portions extend generally downwardly relative to said central portion along the side of the wearer's nose; and
   a protrusion on said front surface, said protrusion extending outwardly relative to said front surface with said protrusion being disposed on said side portions and extending along said portions at an angular orientation to said central portion;
   wherein said protrusion is configured for engaging eyeglasses worn by a wearer when said article is affixed to the wearer's nose to thereby inhibit the eyeglasses from slipping down the wearer's nose.

2. The article of claim 1, wherein said protrusion comprises an elongate protrusion.

3. The article of claim 2, wherein said protrusion is curved.

4. The article of claim 1, wherein said protrusion comprises a pair of protrusions.

5. The article of claim 4, wherein said protrusion extends along said side portions, with one said protrusion on each said side portion.

6. The article of claim 1, wherein said body is curved.

7. The article of claim 1, wherein said side portions are non-linear with respect to said central portion.

8. The article of claim 7, wherein said side portions and said central portion are each generally straight.

9. The article of claim 1, wherein said edges define widths of said body at said side portions that are greater than a width of said central portion.

10. The article of claim 1, wherein said protrusion includes a support surface, and wherein said support surface is configured for engaging with eyeglasses of a wearer when said article is affixed to a wearer's nose to thereby inhibit the eyeglasses from slipping down the wearer's nose.

11. The article of claim 10, wherein said support surface is generally orthogonal with respect to said front face.

12. The article of claim 1, wherein a removable tab is disposed on said back surface to cover said adhesive prior to application of said article to the skin of a wearer.

13. A method of inhibiting eyeglasses worn by a wearer from slipping down the wearer's nose, said method comprising:
providing an article for temporarily affixing to the skin of a wearer about the wearer's nose, said article comprising a body comprising a flexible strip having a back surface, a front surface and a pair of edges, said body being elongate and having a U-shape, said edges defining the width of said body with said body being sized to be disposed on a wearer's nose, wherein said back surface includes an adhesive for temporarily retaining said article on the skin of a wearer, said article further comprising a protrusion on said front surface with said protrusion extending outwardly relative to said front surface with said protrusion being disposed on said side portions and extending along said portions at an angular orientation to said central portion, and said front surface comprising a non-adhesive surface;
wherein said body includes a pair of distally oriented side portions separated by a central portion with said side portions being oriented with respect to said central portion to form a gap between said side portions with said side portions being unitarily formed with and angularly disposed to said central portion to define the U-shape of said body, and wherein said affixing said article to the skin of a wearer comprises affixing said central portion about the bridge of the wearer's nose and affixing said side portions to extend generally downwardly along the side of the wearer's nose relative to said central portion; and
affixing said article to the skin of a wearer about the wearer's nose, wherein said protrusion is configured for engaging eyeglasses worn by the wearer to thereby inhibit the eyeglasses from slipping down the wearer's nose.

14. The method of claim 13, wherein said protrusion comprises an elongate protrusion.

15. The method of claim 13, wherein said protrusion comprises a pair of protrusions.

* * * * *